United States Patent Office 3,836,553
Patented Sept. 17, 1974

3,836,553
CATALYTIC DEHYDROGENATION OF ALCOHOLS
Donald M. Fenton, Anaheim, Calif., assignor to Union Oil Company of California, Los Angeles, Calif.
No Drawing. Filed Dec. 10, 1970, Ser. No. 97,046
Int. Cl. C07c 45/16
U.S. Cl. 260—409                                    18 Claims

ABSTRACT OF THE DISCLOSURE

The catalytic dehydrogenation of alcohols to aldehydes or ketones is described. The catalyst for this reaction is a complex of ruthenium with a biphyllic ligand. Optional cocatalysts such as rhenium compounds can be employed and, preferably, the dehydrogenation is performed under basic conditions. The dehydrogenation of the alcohol liberates hydrogen and, if desired, an unsaturated coreactant can be employed which will be hydrogenated under the reaction conditions. Thus the dehydrogenation of an alcohol to produce a desired ketone can be combined with the saturation of an olefin, a fatty unsaturated oil or acid, etc. In a typical embodiment, cyclohexanol is dehydrogenated to cyclohexanone by contacting with ruthenium trichloride and triphenylphosphine at a temperature of about 200° C. and sufficient pressure to maintain liquid phase conditions. The process can be beneficially employed in the oxidation of hydrocarbons to acids, e.g., in the oxidation of cyclohexane to adipic acid to convert the relatively refractory cyclohexanol to the more reactive cyclohexanone. Similarly, the oxidation can be used in the oxidation of Tetralin to tetralone by conversion of the relatively refractory and intermediate tetralol. The tetralone derivative is a useful intermediate in the production of various insecticides, dyes, etc.

DESCRIPTION OF THE INVENTION

This invention relates to a method for the dehydrogenation of alcohols and, in particular, relates to a catalyst which is useful in effecting the dehydrogenation.

In organic synthesis, it is frequently desirable to dehydrogenate alcohols. Alcohols are formed as relatively refractory intermediates in the oxidation of various hydrocarbons to aldehydes or ketones, e.g., in the oxidation of cyclohexane to adipic acid or in the oxidation of Tetralin to tetralone. The alcohols are not readily dehydrogenated in the absence of a catalyst and, accordingly, it is desirable to have a catalyst which exhibits a high degree of selectively for this dehydrogenation. Additionally, it is desirable to have a catalyst which can be employed under basic or alkaline conditions since the alcohols react under acidic conditions to produce undesired byproducts.

It has now been found that ruthenium complexes of biphyllic ligands function as catalysts for the dehydrogenation of alcohols. It has further been discovered that this catalysis can be promoted by an optional cocatalyst which is a soluble rhenium compound. The catalyst is active for the dehydrogenation at relatively mild conditions, e.g., temperatures of from 30° to 300° C., preferably from about 100° to about 250° C.; and at pressures from about 1 to about 300 atmospheres, preferably from about 1 to about 30 atmospheres, sufficient to maintain liquid phase conditions at the reaction temperature. The catalyst is active at neutral or alkaline conditions and, therefore, can be used under conditions at which the amount of byproducts or side reactions are minimized.

A wide variety of alcohols can be dehydrogenated by reaction in the presence of the catalyst of this invention. The alcohol can, in general, have the following structure:

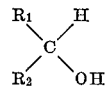

wherein $R_1$ and $R_2$ are the same or different hydrogen, alkyl or alkenyl having from 1 to about 20 carbons, or together form an alkylene group having from about 3 to about 11 carbons.

When the $R_1$ and $R_2$ together comprise an alkylene group, the resultant cyclic alcohol can be substituted with up to about 2 alkyl groups or can be part of a fused ring forming a decahydro naphthol or an aromatic fused cyclohexanol. The total number of carbons in the alcohol can be from 2 to about 25. Examples of suitable alcohols include methanol, ethanol, isopropanol, butanol, 2-ethylpropanol, 2-ethylhexanol, octanol, decanol, dodecanol, heptadecanol, nonedecanol, eicosanol, docosanol, tricosanol, pentacosanol, cyclobutanol, 2-methylcyclopentanol, cyclohexanol, 3-ethylcyclooctanol, 3,3-dibutylcyclodecanol, cyclodecanol, 3-cyclohexylpentanol, tetralol, 2,6-dimethyltetralol, 5-isopropyltetralol, 6-t-butyltetralol, 5-dodecyltetralol, etc.

The catalyst of the invention comprises ruthenium which is in complex association with a biphyllic ligand. A biphyllic ligand is a compound having at least one atom with a pair of electrons capable of forming a coordinate covalent bond with a metal atom and simultaneously having the ability to accept the electron from the metal, thereby imparting additional stability to the resulting complex. Biphyllic ligands can comprise organic compounds having at least about 3 carbons and containing arsenic, antimony, phosphorus or bismuth in a trivalent state. These ligands are known in the art and, accordingly, are not part of the essence of the invention. Of these the phosphorus compounds, i.e., the phosphines, are preferred; however, the arsines, stibines and bismuthines can also be employed. Typical of the suitable ligands are those having the following structure:

wherein E is trivalent phosphorus, arsenic, antimony or bismuth; and wherein R is the same or different alkyl having 1 to 18 carbons, cycloalkyl having 4 to 18 carbons and/or aryl having 6 to 18 carbons. Examples of which are methyl, butyl, nonyl, cyclopentyl, cyclohexyl, cyclodecyl, amylcyclohexyl, phenyl, tolyl, xylyl, 2-phenyl-4-butyloctyl, tetramethylphenyl, etc. Preferably, at least one R is aryl, e.g., phenyl, tolyl, xylyl, etc., preferably having 6 to 9 carbons and, most preferably, the ligand is triaryl.

Examples of suitable biphyllic ligands having the aforementioned structure and useful in my invention are the following: trimethylphosphine, triethylarsine, triethylbismuthine, triisopropylstibine, dioctylcycloheptylphosphine, tricyclopentylphosphine, tricyclohexylphosphine, ethyldiisopropylstibine, tricyclohexylphosphine, methyldiphenylphosphine, methyldiphenylstibine, triphenylphosphine, triphenylbismuthine, tri(o-tolyl)-phosphine, phenyldiisopropylphosphine, phenyldiamylphosphine, ethyldiphenylphosphine, phenylditolylphosphine, xylyldiphenylarsine, trixylylstibine, cyclopentyldixylylstibine, dioctylphenylphosphine, tridurylphosphine, trixylylbismuthine, etc. Of the aforementioned, the aryl phosphines, preferably the diarylphosphines and, most preferably, the triarylphosphines (e.g., triphenylphosphine) are employed because of the increasing activity of the phosphines with increasing aromaticity.

A catalytic quantity of ruthenium is used, e.g., 0.002–2 weight percent of the reaction medium, and the ruthenium can be added in any convenient manner such as a soluble salt, complex, acid or oxide or salt. Preferably the ruthenium is added as a salt such as a halide (chloride, bromide, fluoride, iodide), nitrate, nitrite or $C_1$ to $C_{10}$ hydrocarbyl carboxylate, e.g., acetate, propionate, butyrate, valerate, benzoate, octanoate, etc. Examples of useful Group VIII noble metal sources are ruthenium nitrate, ruthenium chloride, ruthenium fluoride, ruthenium hydroxide, ruthenium cyanide, ruthenium sulfate, ruthenium sulfite, ruthenium carbonate, ruthenium propionate, ruthenium acetate, etc. Examples of suitable complexed sources are ruthenium pentacarbonyl, ruthenium pyridyl chloride, ruthenium chloride triphenylphosphine, ruthenium nitroso chloride, chlororuthenic acid, etc. The particular source of the ruthenium is not part of the essence of the invention since ruthenium from the widely varied sources indicated above will, nevertheless, still form a complex with the aforementioned biphyllic ligand.

The ruthenium may be complexed with the above-described biphyllic ligand before being introduced into the reaction medium or the complex may be formed "in situ" by simply adding a ruthenium compound and the biphyllic ligand directly to the reaction medium. In either case, it is generally preferable that the quantity of biphyllic ligand be in excess (e.g., 10–300% of that stoichiometrically required to form a complex with the ruthenium. The complex has from 1 to about 5 moles of biphyllic ligand per ruthenium atom and other components such as hydride, nitroso, or soluble anions such as $C_1$–$C_5$ carboxylate (e.g., acetate, propionate, isobutyrate, valerate, etc.), halide, etc., may be, but need not be, included in the complex catalyst of this invention. These components may be incorporated in the catalyst by the formation of the catalyst complex from a ruthenium salt of complex of the indicated anions or ligands.

A cocatalyst that can be used with the ruthenium catalyst is a rhenium compound. Rhenium compounds that are suitable for use are rhenium oxides such as rhenium trioxide, rhenium heptoxide, rhenium sesquioxide, etc.; alkali metal alkaline earth metal and ammonium perrhenates, such as sodium perrhenate, potassium perrhenate, calcium perrhenate, ammonia perrhenate, etc., rhenium halides such as rhenium trichloride, rhenium tetrachloride, rhenium hexachloride, rhenium oxyhalides such as rhenium trioxybromide, rhenium oxytetrachloride, rhenium trioxychloride, rhenium oxytetrafluoride, rhenium dioxydifluoride, etc. Preferably rhenium compounds are used which are soluble in the particular reaction medium, hereafter described. The rhenium compound can be used in catalytic quantities, e.g., 0.002 to about 2.0 weight percent of the reaction medium and in weight proportions, relative to the ruthenium catalyst of from 1/10 to about 10/1 weight ratios, calculated as the metals.

The reaction is performed under liquid phase conditions and may be performed in a liquid organic solvent, i.e., a liquid in which the reactants and the catalyst are soluble. The reaction is performed under anhydrous conditions with less than 10 and, preferably, less than 1 percent water in the reaction medium. Most preferably the medium is entirely anhydrous. The liquid should also be inert to the reactants, catalyst and products under the reaction conditions. Suitable solvents include, for example, hydrocarbons, ketones, carboxylic acids, esters and ethers, Examples of hydrocarbon solvents are pentane, hexane, heptane, isooctane, dodecane, naphtha, cyclohexane, indane, benzene, toluene, xylene, durene, pseudocumene, Tetraline, etc. Examples of ketones are acetone, diethyl ketone, diisopropyl ketone, methyl-n-amyl ketone, cyclohexanone, etc. Examples of ethers are the alkyl and aryl ethers such as diisopropyl ether, di-n-butyl ether, ethylene glycol diisobutyl ether, ethyl benzyl ether, methylo-tolyl ether, diethyl ether, diethylene glycol diethyl ether, triethylene glycol diethyl ether, tetraethylene glycol dimethyl ether, etc.

Various esters can also be employed as solvents such as methyl acetate, ethyl acetate, isopropyl acetate, ethyl propionate, sec-butyl acetate, isobutyl acetate, ethyl n-butyrate, n-butyl acetate, isoamyl acetate, n-amyl acetate, isoamyl n-butyrate, diethyl oxalate, glycol diacetate, isoamyl isovalerate, methyl benzoate, ethyl benzoate, methyl salicylate, n-propyl benzoate, n-dibutyl oxalate, etc.

The reaction can, optionally, be combined with the saturation or hydrogenation of an unsaturated coreactant. Examples of such coreactants are olefins, unsaturated fatty acids and unsaturated oils and fats. Examples of various unsaturated fats or oils include materials such as cottonseed oil, safflower oil, corn oil, etc., which are the triglycerides of the various unsaturated fatty acids such as oleic, linoleic, myristoleic, palmitoleic, dodecenoic, pentadecenoic, etc. The unsaturated fatty acids themselves can be hydrogenated by incorporation of these materials in the reaction medium. Any of the aforementioned unsaturated fatty acids as well as the unsaturated fatty acids having from about 4 to about 25 carbons can be saturated, as well as the oligomers or lower polymers of these acids, e.g., dimers, trimers or tetramers thereof. The alkali metal salts of these acids can also be reacted to obtain saturation of the acid without experiencing any undesired side reaction with the alcoholic reactant. Examples of various oligomers are linoleic dimer, oleic dimer, tall oil fatty acid dimers, palmitoleic trimer, etc. Examples of various unsaturated acids which can be hydrogenated include crotonic acid, vinyl acetic acid, butenoic acid, pentenoic acid, hexenoic acid, octenoic acid, decenoic acid, etc. Examples of various olefins which can be hydrogenated by inclusion of the olefin in the reaction medium comprise the olefins having from about 4 to about 25 carbons, e.g., butene, pentene, hexene, octene, decene, dodecene, heptadecene, octadecene, eicosene, tetracosene, etc., or the sodium, lithium or potassium salts thereof.

The reaction is performed under liquid phase conditions and the liquid phase can be formed from the reactant alcohol, the unsaturated coreactant, any of the aforementioned inert solvents or mixtures thereof.

The reaction can be performed at relatively low temperatures, e.g., 30° to about 300° C. and preferably from 100° to about 250° C. and at low pressures, sufficient to maintain liquid phase conditions under the temperature of the reaction. Pressures from about 1 to about 300 atmospheres, preferably from about 1 to about 30 atmospheres, can be employed. The reaction evolves hydrogen, all or a portion of which can be used for the in situ hydrogenation of an unsaturate as previously described. Any unconsumed hydrogen will accumulate in the reaction zone and increase the pressure. This may not be objectionable, however, it may be desirable to continuously or intermittently remove the hydrogen by withdrawal of the reactor gas phase during the reaction. This can be accomplished by releasing or dropping the pressure on the reactor or by circulating an inert gas to sweep the solvent hydrogen from the reactor.

The reaction is also preferably performed under basic conditions. Since the reactant mixture is somewhat basic, added base may not be necessary for the preferred condition. When more alkaline conditions are desired, an alkaline material such as an alkali metal hydroxide, e.g., sodium, potassium, lithium hydroxide, can be added in an amount from about 0.1 to about 5.0 weight percent.

The reaction may be carried out in a batch or in a continuous process. In the batch process, the reactants, catalyst and solvent, when employed, can be charged to the reaction zone and the reaction can be performed until a substantial amount or all of the reactant alcohol has been dehydrogenated. The alcohol reactant can be continuously charged during this batch processing or the products can be continuously withdrawn during the conversion. The continuous introduction of the alcoholic reactant and the continuous withdrawal of a crude reaction product containing the carbonyl product results in continuous processing. The crude reaction product recovered from the dehydrogenation can be treated in a conventional manner to recover the carbonyl products, e.g., by solvent extraction, distillation, crystallization, etc. The reaction medium remaining after removal of the carbonyl compound can be recycled to the reaction zone together with any of the catalysts or cocatalysts and unconverted alcoholic reactant which may be separated during the product recovery.

The following examples will serve to illustrate a mode of practice of the invention and to demonstrate results obtainable thereby.

EXAMPLE 1

The reaction is performed in a 500 milliliter laboratory flask which is charged with 0.5 gram ammonium perrhenate, 0.5 gram ruthenium trichloride, 4 grams triphenylphosphine, 1 gram potassium hydroxide, 100 milliliters 1-decene and 100 milliliters cyclohexanol. The flask is fitted with a Dean-Stark tube and the contents are heated to reflux temperature and maintained at that temperature for 24 hours. Upon completion of the refluxing period, the products are removed and separated to recover a product comprising 39 weight percent of a mixture of decenes and decane, 36 percent cyclohexanol and 15 percent cyclohexanone.

When the experiment is repeated with substitution of rhenium chloride for the ammonium perrhenate or substitution of tri(tolyl)phosphine for the triphenylphosphine, a similar reaction occurs.

When the experiment is repeated with substitution of cycloheptanol for the cyclohexanol, a similar reaction to produce cycloheptanone occurs.

EXAMPLE 2

The reaction is repeated by charging the reactants to a steel bomb. To this tseel bomb is charged 0.5 gram ruthenium trichloride, 50 milliliters cyclohexanol, 50 milliliters 1-octene, 0.5 gram ammonium perrhenate and 5 grams triphenylphosphine. The bomb is pressured to 100 p.s.i.g. with nitrogen and then heated while rocking to 225° C. and maintained at that temperature for 6 hours. Upon completion of the reaction period, the products are removed and distilled to recover 29 milliliters octane and 21 milliliters cyclohexanone.

When the experiment is repeated with substitution of ethyldiphenylphosphine for the triphenylphosphine, a similar reaction occurs.

When the experiment is repeated with substitution of 4-ethylcyclooctanol for the cyclohexanol, a similar reaction to produce 4-ethylcyclooctanone occurs.

EXAMPLE 3

The steel bomb is charged with 0.5 gram ruthenium trichloride, 0.5 gram ammonium perrhenate, 5 grams triphenylphosphine, 50 milliliters 1-octene and 50 milliliters butanol. The bomb is closed and pressured to 100 p.s.i.g. with nitrogen. The bomb is then rocked while heating the contents to 225° C. and maintaining them at that temperature for 6 hours. Upon completion of the reaction period the bomb contents are removed and the products separated to recover 8 grams octane, 0.7 gram butyraldehyde, 2.1 grams 2-ethylhexanal and 1.8 grams 2-ethylhexenal.

When the experiment is repeated with substitution of phenyldiethylphosphine for the triphenylphosphine, a similar reaction occurs.

EXAMPLE 4

The bomb is charged with a reaction mixture of 0.5 gram ruthenium trichloride, 0.5 gram ammonium perrhenate, 5 grams triphenylphosphine, 5 milliliters water and 50 milliliters 2-octanol. The bomb is pressured with nitrogen to 100 p.s.i.g. and is rocked while heating the contents to 225° C. and maintaining them at that temperature for 5 hours. Upon completion of the reaction period, the contents of the bomb are removed and there is recovered 17 grams of 2-octanone therefrom.

When the experiment is repeated with substitution of triphenylarsine for the triphenylphosphine, a similar reaction occurs.

When the experiment is repeated with substitution of 1-heptadecanol, a similar conversion to heptadecanal occurs.

EXAMPLE 5

A laboratory flask is charged with 400 milliliters of a mixture comprising 80 percent Tetralin, 2 percent naphthalene, 7.3 percent alpha tetralol, 8.7 percent 2-tetralone. To this mixture is added 0.5 gram ruthenium trichloride, 1 gram potassium hydroxide and 3 grams triphenylphosphine. The resulting mixture is heated to reflux and maintained at that temperature with stirring for 24 hours. Upon completion of the reaction period, the flask contents are removed and distilled to separate 79 percent Tetralin, 2.1 percent naphthalene and 16.5 percent alpha tetralone. No alpha tetralol was found in the products.

When the experiment is repeated with the substitution of 2,6-dimethyltetralol for the tetralol, a similar conversion to 2,6-dimethyltetralone occurs.

The invention has been illustrated by the preceding examples which are intended solely to teach a mode of practice of the invention. It is not intended that the invention be unduly limited by this illustration. Instead, it is intended that the invention be defined by the reagents, conditions and steps, and their obvious equivalents set forth in the following claims.

I claim:

1. The method for the dehydrogenation of alcohols which comprises contacting an alcohol having from 2 to about 25 carbons and the following empirical formula:

$$R_1R_2CHOH$$

wherein: $R_1$ and $R_2$ are the same or different groups selected from the class consisting of hydrogen, alkyl and alkenyl having from 1 to about 20 carbons, or together form an alkylene group having from 3 to about 11 cyclic carbons under liquid phase conditions with from 0.002 to 2 weight percent, based on said liquid phase, of a catalyst comprising a ruthenium complex formed in situ by the addition to said liquid phase of a soluble ruthenium salt selected from the class consisting of halides, nitrates, nitrites and $C_1$–$C_{10}$ hydrocarbyl carboxylates and a biphyllic ligand having the following structure:

$$ER_3$$

wherein:

E is trivalent phosphorus, arsenic, antimony or bismuth;
R is the same or different alkyl having 1 to 18 carbons, cycloalkyl having 4 to 18 carbons, or phenyl or alkyl phenyl having 6 to 18 carbons;

maintaining the conditions of said contacting at a temperature of from 30° to 300° C. and a pressure from 1 to about 100 atmospheres, sufficient to maintain said liquid phase conditions and thereby dehydrogenate said alcohol and form a carbonyl compound comprising an aldehyde or ketone having the same number of carbon atoms as said alcohol reactant.

2. The method of claim 1 wherein said contacting is performed in the presence of from about 0.1 to about 5.0 weight percent of an alkali metal hydroxide.

3. The method of claim 1 wherein said contacting is performed in the presence of 0.002 to 2 weight percent of ammonium perrhenate.

4. The method of claim 1 wherein said ligand is present in an amount from 10 to 300 percent in excess of the amount present in said complex.

5. The method of claim 2 wherein said biphyllic ligand contains at least one phenyl or alkyl phenyl group.

6. The method of claim 5 wherein said biphyllic ligand contains at least two phenyl or alkyl phenyl groups.

7. The method of claim 5 wherein said biphyllic ligand contains 3 phenyl or alkyl phenyl groups.

8. The method of claim 7 wherein said biphyllic ligand is triphenylphosphine.

9. The method of claim 2 wherein said alcohol is cyclohexanol.

10. The method of claim 2 wherein said dehydrogenation is performed in the presence of an ethylenically unsaturated compound selected from the class of olefins and alkenoic acids having from 4 to about 25 carbons to thereby effect hydrogenation of said compound simultaneous with the dehydrogenation of the alcoholic reactant.

11. The method for the dehydrogenation of tetralol which consists essentially of contacting said tetralol under liquid phase conditions with from 0.002 to 2 weight percent, based on said liquid phase, of a ruthenium complex formed in situ by the addition to said liquid phase of a soluble ruthenium salt selected from the class consisting of halides, nitrates, nitrites and $C_1$–$C_{10}$ hydrocarbyl carboxylates and a biphyllic ligand, said ligand having the following structure:

$$ER_3$$

wherein:

E is trivalent phosphorus, arsenic, antimony or bismuth;
R is the same or different alkyl having 1 to 18 carbons, or alkyl phenyl having 6 to 9 carbons;

maintaining the conditions of said contacting at a temperature of from 30° to 300° C. and a pressure from 1 to about 100 atmospheres, sufficient to maintain said liquid phase conditions and thereby dehydrogenate said tetralol and form tetralone therefrom.

12. The method of claim 11 wherein said contacting is performed in the presence of 0.1 to about 5 weight percent of an alkali metal hydroxide.

13. The method of claim 12 wherein said ligand is present in an amount from 10 to 300 percent in excess of the amount present in said complex.

14. The method of claim 12 wherein said ligand is a phosphine.

15. The method of claim 14 wherein said phosphine contains at least one phenyl or alkyl phenyl group.

16. The method of claim 14 wherein said phosphine contains at least two phenyl or alkyl phenyl groups.

17. The method of claim 14 wherein said phosphine contains three phenyl or alkyl phenyl groups.

18. The method of claim 14 wherein said phosphine is triphenylphosphine.

References Cited
UNITED STATES PATENTS

| | | | |
|---|---|---|---|
| 2,083,877 | 6/1937 | Steck et al. | 260—586 R X |
| 3,488,400 | 1/1970 | Candlin et al. | 252—431 R |

LEON ZITVER, Primary Examiner

N. MORGENSTERN, Assistant Examiner

U.S. Cl. X.R.

252—431 R, 540; 260—586 R, 590, 596, 603 R, 683.9, 586 A